United States Patent Office 3,272,115
Patented Sept. 13, 1966

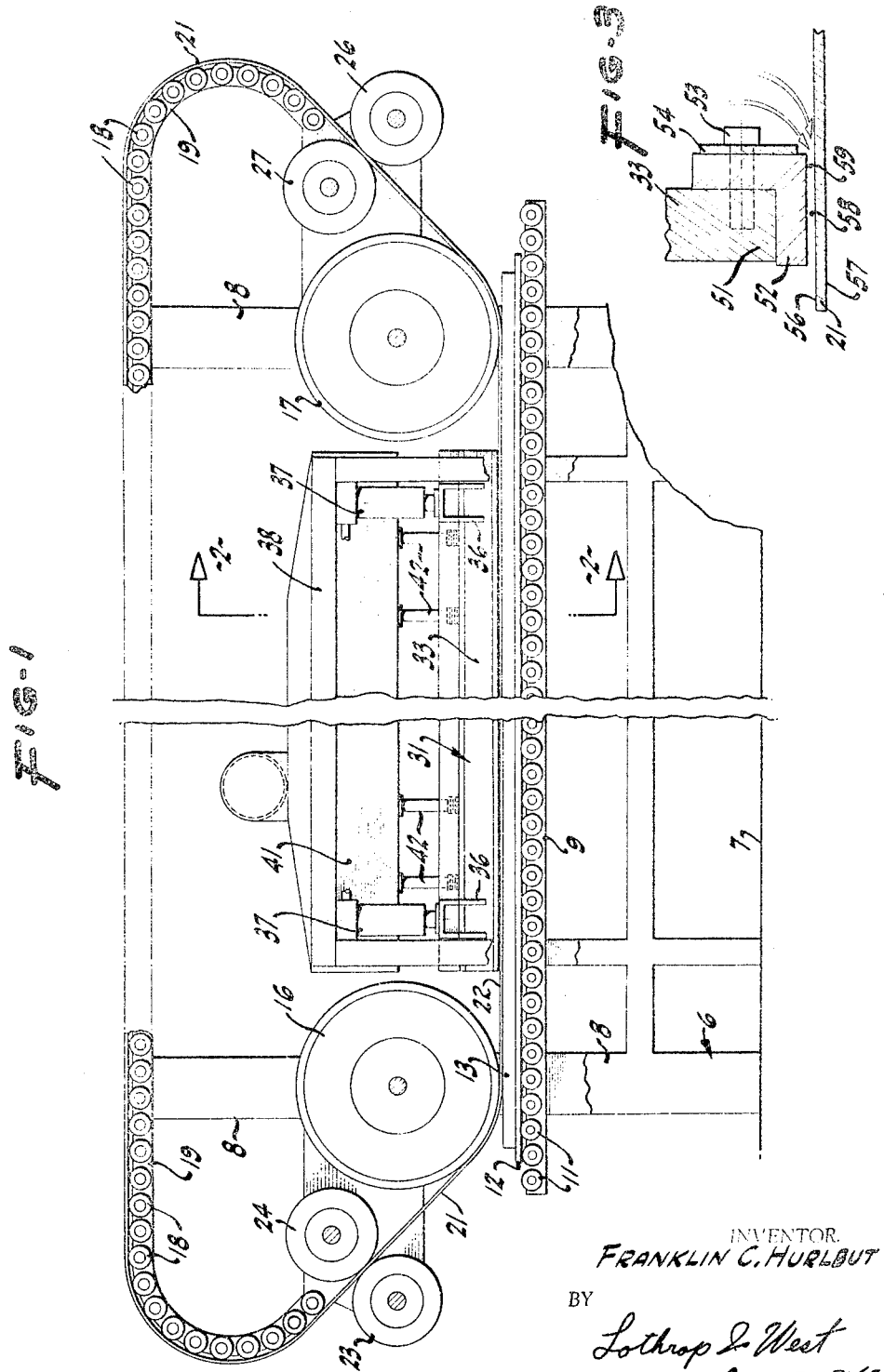

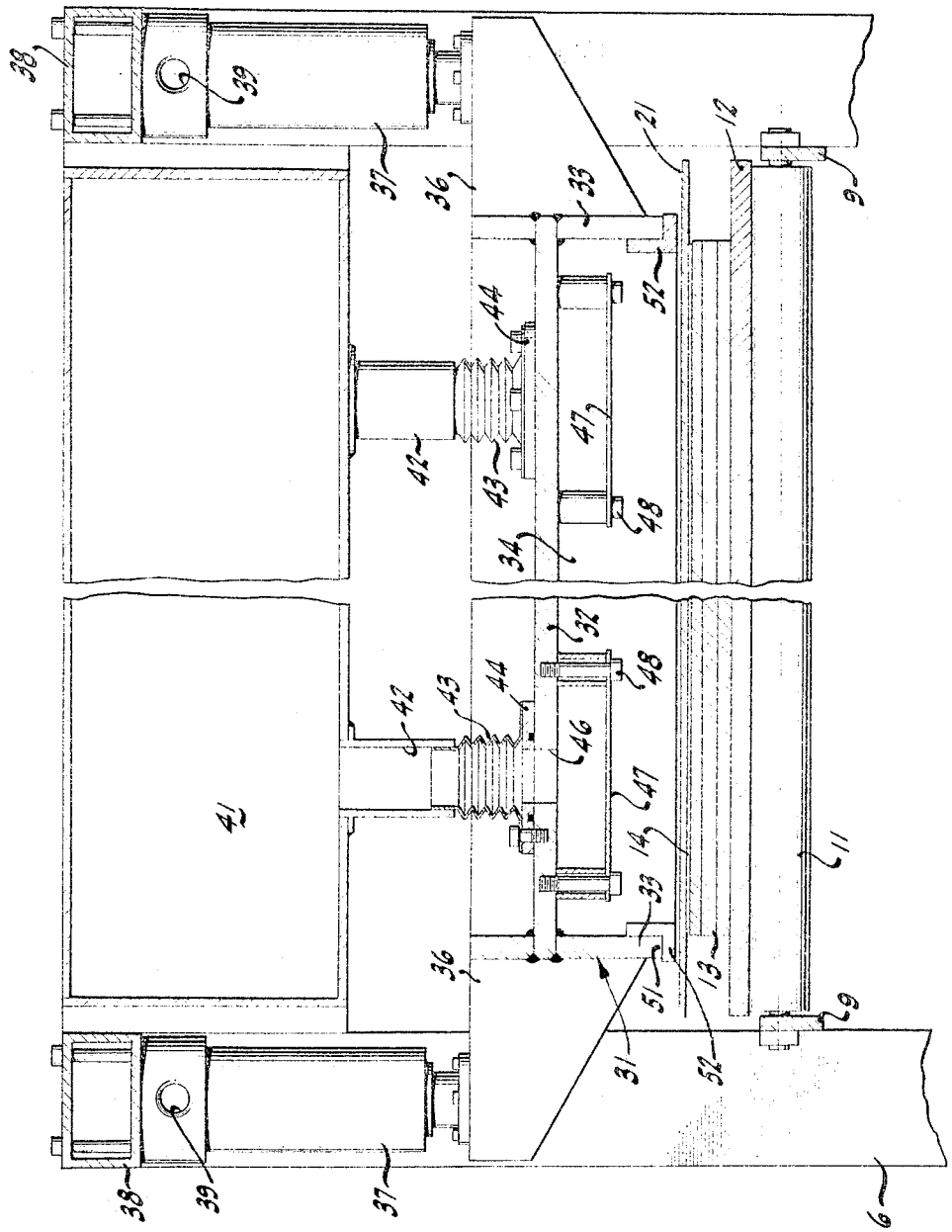

3,272,115
CONTINUOUS LAMINATING PRESS
Franklin C. Hurlbut, Berkeley, Calif., assignor to The Regents of the University of California, Berkeley, Calif.
Filed Sept. 11, 1964, Ser. No. 395,735
14 Claims. (Cl. 100—93)

My invention relates to a device for use in continuously applying some sort of sheet material to a substrate such as plywood, particle board, hard board, and the like, and concerns a device useful in providing sufficient heat and pressure to afford a satisfactory product. At the present time, batch processes are used in making laminations, particularly when heat is required for effectuating setting of adhesives and the like, and when pressure is required to position and hold the laminae while the setting is taking place or to serve as a factor in curing, densifying or texturing the material. Presently laminations are not made by continuous operation. This is somewhat unsatisfactory in many respects, although adequate in others. There is considerable room for substantial improvement.

It is therefore an object of my invention to provide a continuous laminating press effective to provide heat and pressure to sheets continuously advancing to be laminated and secured together and for curing, densifying or texturing the material.

Another object of the invention is to provide a continuous laminating press having a low friction load and low maintenance.

Another object of the invention is to provide a continuous laminating press in which the reduction in friction load is accompanied by means accomplishing addition of heat to the material being treated.

A still further object of the invention is to provide a continuous laminating press that can operate satisfactorily on a relatively small amount of power or energy both for heat supply and for mechanical functioning.

Another object of the invention is to provide a continuous laminating press in which the mechanical parts are all relatively standard and well known, so that the initial cost and the maintenance difficulties are of reasonable character.

Another object of the invention is in general to provide an improved heating press of a continuous nature.

Other objects together with the foregoing are attained in the embodiment of the invention described in the accompanying description and illustrated in the accompanying drawings, in which:

FIGURE 1 is a side elevation of a continuous laminating press constructed pursuant to the invention, portions being shown somewhat diagrammatically and other portions being broken away to disclose the interior construction of the machine;

FIGURE 2 is a cross section to an enlarged scale of a portion of the machine shown in FIGURE 1, the plane of section being indicated by the line 2—2 of FIGURE 1, and portions of the figure being removed to reduce its size; and FIGURE 3 is a detail cross section showing a portion of the belt and pressure box.

The general environment of use of the continuous laminating press can be exemplified by the operation of continuously laminating a sheet material such as an overlay of medium density wood pulp paper onto a sheet of material such as plywood, particle board, hard board, or the like, by means of an adhesive applied to the laminating sheet and is of a thermo setting nature.

In this instance and for this purpose I provide a frame 6 made of the customary structural members resting on a base 7 and including a number of uprights 8 on which horizontally arranged and longitudinally extending side rails 9 are fastened. Journalled on the side rails and spanning the space between them is a plurality of supporting rollers 11 arranged with their axes parallel and all lying in a horizontal plane so as to form a bed of considerable width and length. The width is somewhat greater than that of the sheets to be laminated and the length is such that the sheets can easily be fed into the machine, processed in the machine, and then discharged from the machine after processing. The substantially horizontal bed so formed is supplemented by a relatively rigid, loose plate 12 usually of metal and of considerable stiffness which serves as a separate carrier for the materials being laminated. For example, as shown to larger scale in FIGURE 2, the plate 12 in this instance carries a multiple sheet 13 of plywood onto which a cover sheet 14 of paper is to be adhered under heat and pressure by adhesive disposed between the two of them.

In order to provide appropriate pressure and heat for this purpose, the frame 6 is provided in the upper extensions of the uprights 8 with a pair of large guide drums 16 and 17 as well as a plurality of relatively small rollers 18 all mounted on a frame 19 secured to the uprights and defining a somewhat trapezoidal support for an endless belt 21. The belt is trained around the outside of the various drums and rollers and is thus contoured to afford a lower run 22 that is spaced a short distance above the bed formed by the rollers 11 and that extends in a horizontal plane, being parallel to the plate 12. The belt 21 is of a width slightly greater than the width of the material to be laminated, and in fact is comparable in width to the rollers 11. The belt is relatively flexible and is made of a material that is a good conductor of heat, for example, steel. The belt is thin and bends easily around the drums 16 and 17 and around the various other curved portions of the trapezoidal path. Preferably the belt is extremely smooth on both sides and in practice is actually polished so as to make sure that it is of uniform surface characteristics and of a uniform or substantially uniform thickness throughout.

Since its is assumed that the material is fed into the press from the left-hand end in FIGURE 1 and travels toward the right thereof, the belt 21 is made to operate in a counterclockwise fashion, as seen in FIGURE 1. For that reason, the frame 6 between the drums 16 and 17 and the various rolls 18 is provided with a pair of drive rollers 23 and 24 at the left-hand end and a pair of drive rollers 26 and 27 at the right-hand end. These drive rollers are connected to suitable motive power, not shown, and have the effect of advancing the belt 21 and simultaneously of rotating the rotary machinery in contact therewith. The position of the drums 16 and 17 and of the bed is such that the distance between them is very nearly that of the original lamination to be compressed and completed.

Particularly pursuant to the invention, means are provided for exerting pressure on the belt in order in turn to exert pressure on the layers being laminated. Simultaneously there is provided a supply of heat in order to carry out the thermo setting reaction to secure the laminae together. For this reason, there is provided on the frame 6 a pressure box 31. This is a structure generally rectangular in plan having a top wall 32, side walls 33 and end walls 34, but having no bottom wall. The pressure box is carried on a subframe 36 extending over the bed part way and supported on a plurality of jack devices 37. These are mounted on a superframe 38 intermedaitely connected to the frame 6.

The jacks 37 are intended to be operated simultaneously and each is provided with a port 39 connected to a suitable source of pressure fluid, not shown. This pressure fluid can be a compressible gas such as air or can be a liquid such as hydraulic oil, the circuitry being such that the jacks 37 do not at any time lock tightly in position, but always retain a degree of resilience or motion. When the actuating pressure fluid is put into the ports 39, the subframe 36 is moved downwardly toward the bed, whereas when the pressure fluid is reversed, then pressure is relieved and the subframe 36 can rise. If the jacks 37 are made double acting, the subframe 36 and the pressure box 31 can be positively raised. The extent of motion of the pressure box 31, however, is not great in most installations.

It is possible to have the pressure box 31 lowered under the pressure of the jacks 37 and actually to come into frictional contact with the upper side of the running belt 21 and thus deflect the belt sufficiently to drive the subjacent laminae 13 and 14 firmly onto the plate 12. This, however, is productive of a great deal of wear, requires an inordinate amount of power, and provides a machine of extremely short life. Particularly pursuant to the invention, therefore, there is located on the frame 38 a plenum chamber 41 connected to a source of gas under pressure and to means for heating that gas. Customarily, compressed air is provided at a temperature within a range of a few hundred degrees F., say, 200° F., and at a pressure within a range of a few hundred pounds p.s.i., say, approximately 200 pounds p.s.i.

Air from the plenum chamber is conducted through conduits 42 into different top portions of the pressure box 31 in order to afford an even distribution. The conduits do not extend entirely to the pressure box, but the connection is completed through flexible bellows 43 secured to end plates 44 and discharging through openings 46 to the interior of the pressure box. Baffle plates 47 depending from fastening studs 48 are provided so that the air flow is substantially uniform within the pressure box 31.

Except for the inlet openings 46, the pressure box has no other opening, save its open bottom. Thus, any hot air under pressure entering the pressure box 31 can escape only around the lower edges 51 thereof. These edges are all arranged in a common horizontal plane and each of them is preferably provided with a wearing reinforcement 52 or shoe conveniently made of a good antifriction material having a good thermal stability. An example is a glass fibre which is impregnated with a stabilized fluorinated hydrocarbon. This reinforcing shoe 52 is secured in place by a plurality of studs 53 acting against a holding plate 54. The shoe 52 is intended to operate at a small distance above the upper surface 56 of the belt 21, the lower surface 57 of which is against the materials being compressed and united.

The quantity of air entering the pressure box is such that the air passing out through the passageway 58 between the lower face 59 of the shoe 52 and the upper surface 56 of the metal belt affords an air bearing. That is to say, despite the downward pressure of the jack members 37 due to the pressure of the fluid acting in them and despite the weight of the pressure box and its attendant mechanism in addition, the flow of air through the passage 58 provides sufficient upward force component so that the shoe 52 does not come into frictional contact with the surface 56 of the belt. In this fashion, the friction load on the machine due to the relative motion between the shoe 52 and the belt 21 is made extremely small.

The sizes of the passage 58; that is, its height or the distance between the surfaces 56 and 59, its length which is the distance between its inlet and its outlet, and its peripheral length or perimeter, are all such with respect to the pressure exerted that an optimum flow of air occurs outwardly from the pressure box at a rate to transfer sufficient heat from that air through the belt 21 into the subjacent materials being laminated and cured.

Stated somewhat differently, the amount of heat supplied to the material passing through the machine is a function, among other factors, of the temperature of the air and of the quantity of air flowing through the pressure box to the outside. The quantity of air flowing is a function of the size of the passage 58. Usually the width of that passage and its perimeter are fixed in any one machine. It is possible by varying the height of the passage 58 to vary the flow of air while keeping the air pressure constant. It is also possible to vary the amount of air flowing without changing the height of the passage 58 by varying the air pressure. Varying the air pressure results in varying the total pressure exerted by the belt. A further factor is the pressure exerted downwardly by the jacks in addition to the weight of the so-suspended parts. Thus by varying the pressure within the jacks 37, by varying the air pressure, and by varying the air temperature, various controllables are provided for effectuating an appropriate operation of the machine, depending upon the materials being handled and the speed with which the belt is advanced. Under all circumstances, sufficient air is passed through the passageway 58 so that an air bearing is maintained, although if there should be a temporary failure for any reason and if the shoe 52 should momentarily drag frictionally on the belt 21, the material of the shoe is such as to afford some lubrication, and little damage is done if the frictional engagement is maintained only for a short time.

As an example, in a representative machine the following can be considered. A typical difference in pressure between the interior of the pressure box and the exterior thereof, normally at atmospheric pressure, will be in the range of 150 to 250 pounds p.s.i. The temperature of the hot air or gas will ordinarily lie in the range between 100° to 300° F. The space 58 between the surfaces 56 and 59 will be from .001 inch to .010 inch, while the length of the passage 58 will be of the order of .5 to 1 inch. Since the perimeter of the pressure box is relatively great compared with the length of the passage 58, the flow from within the pressure box may be considered as two dimensional. If this perimeter or seal length is considered by unit quantities, it is found that for a gap of .001 of an inch; that is, a distance between the surfaces 56 and 59 of .001 of an inch, and for a length of the passage 58 of 1 inch, that the velocity of flow of air is about 500 feet per second, and that 1.7 pounds per second of air will travel through the passage 58 for each 50 feet of the seal perimeter or passage length. If the temperature within the pressure box is 200° F., the sonic speed of the air is 1,260 feet per second. As the height of the passage 58 is increased, the air flow velocity will increase until it approaches sonic speed. From this it is estimated that the maximum leak or hot air discharge rate will be about twice the value above given for each 50 feet of seal length for each additional .001 of an inch increase in gap spacing or height of the passage 58. Considered oppositely, an increase in the length or perimeter of the gap or passage 58 will decrease the leak rate very nearly in proportion to the square root of the gap length.

Thus with a suitable supply of hot, pressure gas to the plenum 41 and of pressure fluid to the jacks 37 and with a lamination on the plate 12, the machine is so adjusted that the upward force on the pressure box due to the pressure of air within it is sufficient to balance the downward force due to the jacks 37 and the weight of the suspended structure at a point so that the passage 58 or gap is of the desired dimension. This affords an appropriate amount of energy supplied in the form of heat to the upper side of the belt 21 beneath the pressure box 31. In this fashion the machine operates with a suitable heat input for curing of the laminates. The friction of the device is greatly reduced over other types of machines. Furthermore, the dimensions are not particularly critical and a reasonable variation in the gap height is usually either quickly compensated for by the jacks or simply requires additional or lesser flows of air. This again can be established by appropriate adjustment. The net result is that a uniform pressure is applied over the part of the laminate being treated and a uniform supply of heat is afforded with very little expenditure of work in the press.

While the example illustrated herein includes but a single pressure box, it is contemplated that a number of separate pressure boxes arranged serially can be applied on the same framework so that different pressures and also different temperatures can be successively or simultaneously applied to different areas of the laminate being treated.

What is claimed is:

1. A continuous laminating press comprising a frame, means on said frame for supporting a plate, means on said frame for supporting an endless belt with one run of said belt extending adjacent to said plate, an endless belt on said belt supporting means, a pressure box having an opening on one side bounded by edges, means for supporting said pressure box on said frame with said edges adjacent to but spaced from said belt on the side thereof opposite said plate to leave between said edges and said belt a predetermined clearance passageway extending from said box to the atmosphere, and means for supplying air under pressure to said pressure box and to said passageway continuous outflow through said passageway between said edges and said belt, said outflowing air acting as a spacer between said edges and said belt.

2. A continuous laminating press comprising a frame, means on said frame for supporting an article to be pressed, means on said frame for supporting a belt with one run of said belt adjacent to said article supporting means, a thermally-conducting endless belt on said belt supporting means, means for advancing said belt relative to said frame, a pressure box having an opening on one side bounded by edges, means on said frame for mounting said pressure box with said opening adjacent said one run on the side thereof opposite said article supporting means and for movement toward and away from said belt run to vary the space extending between said pressure box and the atmosphere and located between said edges and said belt run, and means for supplying hot air to said pressure box and continuously discharging said hot air therefrom through said space to the atmosphere.

3. A continuous laminating press comprising a frame, a bed on said frame, a thermally-conducting belt, means for supporting said belt on said frame with one run of said belt adjacent said bed, a pressure box having edges on the other side of said run from said bed, means on said frame for moving said edges of said pressure box toward and away from said run, and means for continuously discharging to the atmosphere hot air under pressure between substantially all of said edges of said pressure box and said run.

4. A continuous laminating press comprising a frame, a horizontal bed on said frame, a horizontal thermally-conducting belt on said frame with one side of one run of said belt adjacent said bed, a pressure box having edges, means on said frame for urging said edges of said pressure box toward the other side of said run, and means for discharging to the atmosphere hot air under pressure between substantially all of said edges of said pressure box and the other side of said run.

5. A continuous laminating press comprising a frame, a horizontal bed on said frame, a horizontal thermally-conducting flexible belt on said frame with one run of said belt disposed above said bed, a pressure box having edges, means for mounting said pressure box on said frame above said run with the lower edges of said box horizontal and for urging said edges into close juxtaposition with but spaced from the upper surface of said belt, and means for forcing hot air under pressure to flow between substantially all of said lower edges and the upper surface of said belt to the atmosphere.

6. A continuous laminating press comprising a frame, a horizontal bed on said frame, a thermally-conducting flexible belt on said frame with one run of said belt extending horizontally above said bed, a pressure box having horizontal lower edges, means on said frame for urging said edges toward the top surface of said belt run, and means for forcing hot air between said edges and said belt run with sufficient pressure to prevent said urging means from moving said edges into frictional contact with said belt run.

7. A continuous laminating press comprising a frame, a planar bed on said frame, a flexible belt on said frame with one run of said belt parallel to said bed, a pressure box having planar edges parallel to and on the other side of said run from said bed, means for yieldingly urging said pressure box toward said run, and means for forcing air between said edges and said run with sufficient pressure to prevent said yielding means from moving said edges into frictional contact with said run.

8. A continuous laminating press comprising a frame, a flexible belt run on said frame, a pressure box, means for yieldingly urging said pressure box toward said belt run, and means for forcing air between said pressure box and said belt run with sufficient pressure to prevent said pressure box and said belt run coming into frictional contact.

9. A continuous laminating press comprising a frame, a smooth metal belt run on said frame, means for advancing said belt run on said frame, a pressure box, means for mounting said pressure box on said frame for movement toward and away from said run, a resilient pressure jack for forcing said pressure box toward said run, and means for forcing air between said pressure box and said run with sufficient pressure to produce a force exactly opposing the forces urging said pressure box toward said run.

10. A continuous laminating press comprising a frame, a flat support bed on said frame, a smooth flexible metal belt, means for supporting said belt on said frame with one run of said belt parallel to said support bed, means on said frame for advancing said run relative to said support bed, a pressure box having edges disposed in a plane, means for mounting said pressure box on said frame for movement toward and away from the side of said run opposite said support bed, resilient means on said frame for pressing said pressure box toward said run, and means on said frame for discharging air under pressure between said edges and said run with sufficient force exactly to oppose the forces pressing said pressure box toward said run.

11. A continuous laminating press as in claim 10 in which said air is at a temperature higher than that on the side of said run adjacent said support bed, whereby heat is transferred from said air through said belt including the portions of said belt opposite said edges.

12. A continuous laminating press as in claim 10 in which said resilient means include a fluid operated jack.

13. A continuous laminating press comprising a frame, a flexible belt, means for mounting said belt on said frame with one portion of said belt constituting a planar run, a pressure box having an opening therein, means for mounting said pressure box on said frame with said opening directed toward said planar run, means defining edges of said pressure box around said opening and terminating in a common plane parallel to said planar run and spaced therefrom to leave a passageway therebetween extending from the interior of said pressure box to the atmosphere, means for supplying said pressure box with fluid under a pressure sufficient to cause flow of said fluid through said passageway to the atmosphere, and a resilient jack on said frame urging said pressure box edges toward said planar run.

14. A continuous laminating press comprising a frame, a flexible belt, means for mounting said belt on said frame with one portion of said belt constituting a planar run, a pressure box having an opening therein, means for mounting said pressure box on said frame with said opening directed toward said planar run, means defining edges of said pressure box around said opening and terminating in a common plane parallel to said planar run, a resilient jack on said frame urging said pressure box edges toward said planar run, and means for flowing fluid from said opening in said pressure box between said edges and said planar run.

References Cited by the Examiner

UNITED STATES PATENTS

| | | |
|---|---|---|
| 756,600 | 4/1904 | Dodge. |
| 1,622,817 | 3/1927 | Waldron. |
| 2,135,763 | 11/1938 | Nicholson _____ 100—93 |
| 2,928,709 | 3/1960 | Baumeister _____ 346—74 |
| 2,937,240 | 5/1960 | Harker _____ 179—100.2 |
| 2,981,307 | 4/1961 | Malarkey _____ 100—154 |

LOUIS O. MAASSEL, *Primary Examiner.*